United States Patent [19]

Hulkkonen et al.

[11] Patent Number: 5,655,466

[45] Date of Patent: Aug. 12, 1997

[54] METHOD AND CONFIGURATION FOR FACILITATING THE FUEL FEED INTO A PRESSURIZED SPACE

[75] Inventors: Seppo Hulkkonen; Martti Äijälä, both of Helsinki, Finland

[73] Assignee: Imatran Voima Oy, Helsinki, Finland

[21] Appl. No.: 411,714

[22] PCT Filed: Sep. 15, 1993

[86] PCT No.: PCT/FI93/00369

§ 371 Date: Apr. 7, 1995

§ 102(e) Date: Apr. 7, 1995

[87] PCT Pub. No.: WO94/09321

PCT Pub. Date: Apr. 28, 1994

[30] Foreign Application Priority Data

Oct. 8, 1992 [FI] Finland ................... 924541

[51] Int. Cl.⁶ ........................................... F23L 1/00
[52] U.S. Cl. .................. 110/348; 110/224; 110/306; 34/413
[58] Field of Search ................... 34/405, 413, 415; 110/224, 221, 348, 306

[56] References Cited

U.S. PATENT DOCUMENTS

| | | |
|---|---|---|
| 3,654,705 | 4/1972 | Smith et al. . |
| 3,815,522 | 6/1974 | Larger ................. 110/224 |
| 3,992,784 | 11/1976 | Verschuur et al. . |
| 4,422,246 | 12/1983 | Hardesty et al. . |
| 4,742,623 | 5/1988 | Meurer et al. ............... 34/403 |
| 4,949,655 | 8/1990 | Greer et al. ............ 110/221 X |

FOREIGN PATENT DOCUMENTS

| | | |
|---|---|---|
| 0276145 | 7/1988 | European Pat. Off. . |
| 3731720 | 4/1989 | Germany . |
| 2036787 | 7/1980 | United Kingdom . |
| 9106807 | 5/1991 | WIPO . |
| 9214802 | 9/1992 | WIPO . |

*Primary Examiner*—Henry A. Bennett
*Assistant Examiner*—Susanne C. Tinker
*Attorney, Agent, or Firm*—Birch, Stewart, Kolasch & Birch, LLP

[57] ABSTRACT

A method and configuration suited to feeding a water-containing fuel such as peat or brown coal into a pressurized space such as a pressurized dryer or a high-pressure gasifier. A fuel with a high moisture content requires drying in a dryer prior to gasification or combustion. In the dryer, the fuel is dewatered, whereby the separated water is discharged as steam from the dryer. The generated steam is separated from the fuel flow exiting the dryer and it can be routed as injection steam to a gas turbine. When a portion of the steam extracted from the fuel flow exiting the dryer is fed into the fuel entering the dryer or to a heat exchanger, which is employed for heating the fuel flow, a fuel of higher moisture content can be fed into the dryer, or alternatively, the moisture content of the fuel can be increased to improve the feed of the fuel. The method imparts no reduction of the economy of the energy generation process.

11 Claims, 2 Drawing Sheets

METHOD AND CONFIGURATION FOR FACILITATING THE FUEL FEED INTO A PRESSURIZED SPACE

BACKGROUND OF THE INVENTION

The present invention relates to a method for feeding a water-containing fuel such as peat or brown coal into a pressurized space.

The method also concerns a configuration for implementing the method.

DESCRIPTION OF THE BACKGROUND ART

The feed of solid material into a pressurized dryer, high-pressure gasifier or any other similar pressurized space is complicated. The greatest difficulties in fuel feed are met when the material to be fed must be transferred over a pressure differential to a higher pressure. The easiest approach would be to feed the fuel by pumping, whereby pressure elevation and transfer of the fuel mixture to a higher pressure could be managed by means of a relatively simple pump without resorting to high-cost special arrangements. The mixture to be pumped must in this case, however, be at a sufficiently high moisture content to permit its transfer by a pump or a ram feeder. If the moisture content of the mixture falls below a material-specific pumpability limit, expensive special methods must be employed for fuel feed. When the moisture content alternatively is elevated to the pumpability limit, the input power to the dryer units employed in the system must be increased, which may result in lower energy generation efficiency of the process and cause unprofitable operation of the system. Therefore, economical gain would be attained through a method capable of feeding water-containing fuels by pumping in an advantageous manner and yet maintaining the profitable and functional capabilities of the system.

In terms of peat production, transport and the process discussed above, the optimal moisture content of peat has been estimated at 60–70%. The pumpability limit of peat is, however, slightly higher than this with a lower limit of at least 75%, while as high figures as 90% and above for pumpability are quoted in the literature of the art. In the tests performed by the applicant, the pumpability limit has typically been in the range of 72–73%, while feeding peat with approx. 65% moisture content has been successfully carried out. These figures indicate that the pumpability limit in terms of process and fuel production factors lies close to the upper limit of the fuel moisture content range. Thus, the fuel is advantageously moisturized for easier feed prior to its feed into the pressurized space.

The Finnish patent application 894,588 discloses a method in which slurried fuel with a high moisture content is fed by pumping into a high-pressure space. In this space the slurry is next dewatered by mechanically removing a sufficient amount of water until the fuel can be fed either directly into a boiler, or alternatively, via a dryer into a high-pressure gasifier. Drying the fuel takes place by, for instance, filtering the water away from the fuel through a permeable wall from the high-pressure space to the ambient pressure. Fuel dewatered in this manner can be combusted in a fluidized-bed boiler without any need for additional drying. If the fuel is gasified, additional drying with the help of a steam dryer must be applied.

The above-described method results in complicated equipment arrangement. Equipment located in the pressurized space is subject to constructional special requirements and the arrangement for filtrate removal over the pressure differential without pressure loss is difficult. This method provides no essential benefit in the gasification of the fuel as the fuel must in any case be subjected to further drying in a pressurized dryer, whereby mechanical drying at elevated pressure solely complicates the equipment layout. Mechanical drying at elevated pressure in conjunction with gasification is justified only when the moisture content of the fuel used is so high as not to permit economical drying in a pressurized dryer.

Further, the Finnish patent 86,219 discloses a method in which coal used as a fuel is moisturized with hot water or steam generated with the waste heat of boiler ash. After increasing the moisture content of the fuel, it can be fed by pumping. The use of additional water is possible only through simultaneous increase of fuel temperature, thereby avoiding an excessive increase in the energy input to the drying stage prior to burning. This method is mainly suited to firing with coal which is pumpable in a relatively dry form, whereby the total amount of water comprised of the additional water and the water contained in the fuel remains relatively low. In the case of materials of a high basic moisture content, the use of additional water from outside the process is not advisable. Similarly to this category, for instance peat must have a very high moisture content to make it pumpable. As the drying of such a fuel mixture prior to its combustion requires the use of a large amount of energy, the drying energy demand caused by the additional water may deteriorate the efficiency of the energy generation process despite the excess heat delivered by the hot water or steam into the fuel heating stage. Since the quantities of the materials fed into the energy generation process are modified in the above-described method, also the process parameters must be tuned. Thus, besides requiring the construction of new equipment, the application of this method necessitates the adaptation of the system to process-specific conditions. The addition of extra water into the fuel causes an increase in equipment size, efficiency losses and decrease in the heat value of the gas entering the gas turbine combustion chamber.

SUMMARY OF THE INVENTION

It is an object of the present invention to achieve a method capable of moisturizing and heating the fuel into a pumpable form without bringing water or heat from outside into the process.

The invention is based on using the outlet steam from the dryer for moisturizing and heating the fuel to be fed into the energy generation process.

More specifically, the method according to the invention comprises a method for facilitating pumping of a water-containing fuel mixture into a pressurized space. The method includes the steps of elevating pressure of the water-containing fuel and of pumping the fuel into a pressurized space. Water is removed from the fuel in the pressurized space by elevating temperature of the fuel. The method further comprises the step of removing fuel and generated steam from the pressurized space and separating them from each other and the step of heating and moisturizing fuel fed into the pressurized space with at least a portion of a flow of steam separated from fuel which has been discharged from the pressurized space. The step of heating and moisturizing taking place prior to the step of pumping the fuel into the pressurized space by mixing a steam flow derouted from the steam flow generated in the pressurized space into a fuel flow prior to bringing the flow to elevated pressure, whereby the steam condenses into the fuel flow, thereby heating and moisturizing the fuel flow.

Furthermore, the apparatus according to the invention comprises a configuration for improving feed of a water-containing fuel mixture into a pressurized space. The configuration comprises a pressurized space and means for elevating pressure of a water-containing fuel. The pressure-elevating means is operatively connected to the pressurized space. Means for pumping the fuel into said pressurized space are operatively connected to the pressure-elevating means. Means for heating the fuel contained in said pressurized space will reduce moisture content of the fuel. Means for discharging said fuel and generated steam from said pressurized space and means for separating said fuel and said steam from each other are provided. Also, means for routing at least a portion of the steam discharged from said pressurized space to heat and moisturize the fuel being fed into the pressurized space are provided. The means for routing comprises a piping nozzle which is connected to a recycle steam piping and the fuel pumping means prior to the pressure-elevating means in order to mix the steam into the fuel flow prior to a pressure elevation stage of the fuel flow.

The invention provides significant benefits.

In the embodiment according to the invention the fuel is moisturized with the steam of the pressurized dryer that is continually recirculated in the system. In this fashion the fuel is not permanently added with any extra water which should be removed after the drying stage. When the mount of water used for moisturizing the fuel and the exit temperature from the moisturizing stage are properly designed, the energy balances of the dryer are maintained constant, that is, the rates of the mount of steam exiting the dryer and the input energy to the dryer remain unchanged. Consequently, the balance equations of the entire energy generation process remain unchanged. Therefore, the method according to the invention only alters the drying process, thus leaving the dryer stage unchanged as seen from the rest of the energy generation process.

The moisture content and temperature of the peat to be pumped can be adjusted to optimal values during the pumping phase within the limits dictated by the process variables and fuel pumpability. As the relative drying time of large fuel particles is shortened by the preheating of the fuel particles and the added water, a more homogeneous drying of the fuel exiting the dryer is attained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention is described in greater detail with the help of the annexed drawings which are given by way of illustration only, and thus are not limitative of the present invention, and in which.

DETAILED DESCRIPTION OF THE PREFERRED EMBODIMENTS

Figure 1:
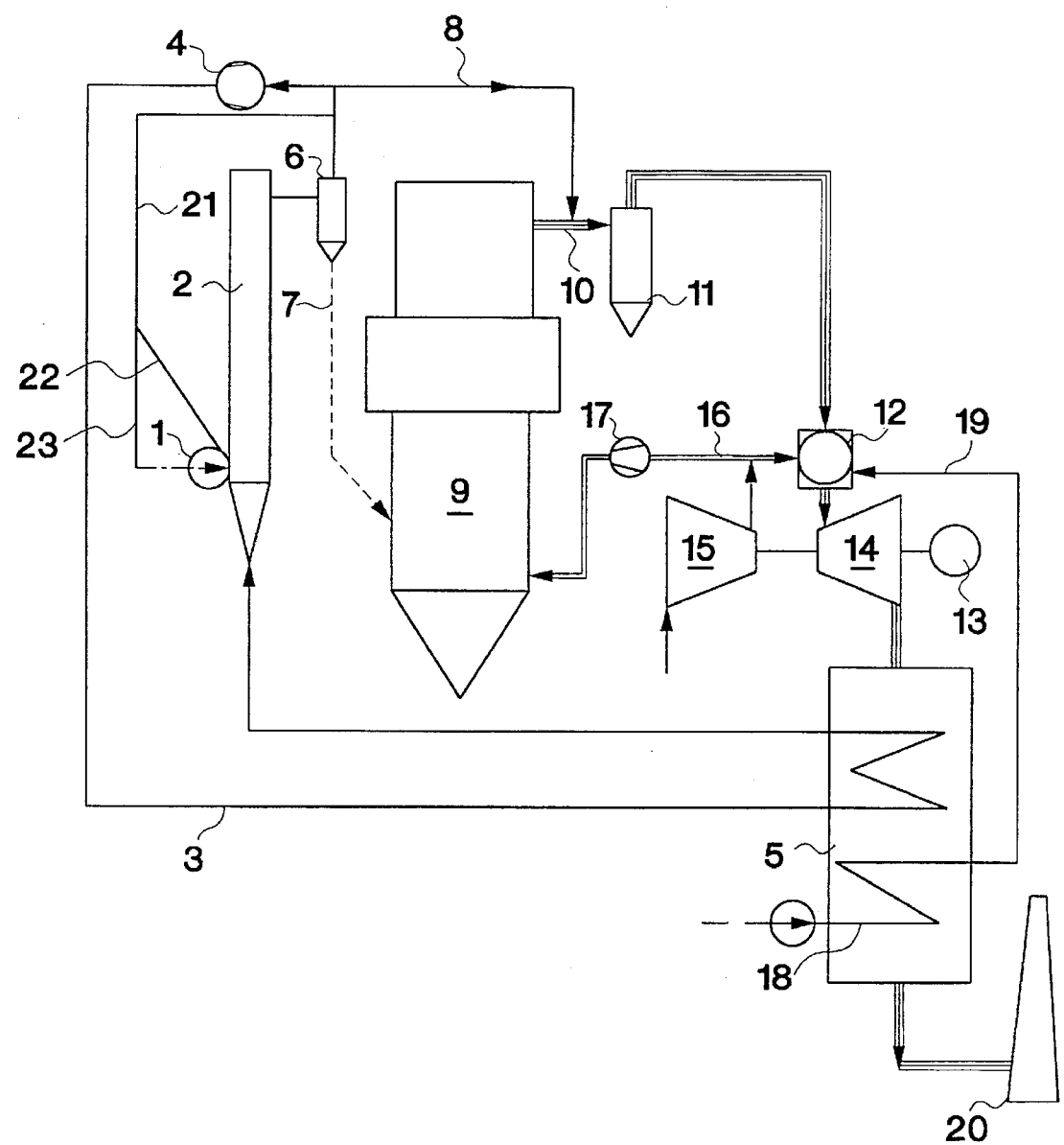
FIG. 1 shows diagrammatically a configuration according to the invention.

In FIG. 1 is a configuration for producing electric energy by means of a gas turbine in a peat-fuelled process is shown.

The wet firing peat is first introduced via a nozzle 1 into a pressurized dryer 2. The drying steam required by the dryer 2 is produced by means of a waste-heat recovery boiler 5 and the steam is recirculated with the help of a blower 4 in a saturated state via the dryer 2 and the waste-heat recovery boiler 5 in a steam recycling circuit 3. The exit line of the steam recycling circuit 3 from the dryer 2 is provided with a separator 6 for separating the steam from the dried fuel. The separator 6 can be, e.g., a cyclone separator. Subsequent to the separator 6, the fuel is routed along a feed line 7 into a high-pressure gasifier 9 where the fuel is gasified into fuel gas by introducing air into it.

Subsequent to the separator 6, the drying steam circuit 3 has a branch line 8, via which the steam released by the fuel is removed from the drying steam circulation. The released steam is routed along the branch line 8 into the fuel gas line 10 exiting the gasifier 9, wherein the steam is mixed into the fuel gas. Next, the mixture of steam and fuel gas is directed to a gas scrubber 11, where the mixture is treated and scrubbed for a gas turbine 14 and thereafter routed to a combustion chamber 12 of the gas turbine. The shaft of the gas turbine 14 drives directly a compressor 15 and a generator 13. The compressor 15 driven by the turbine 14 feeds compressed air into an air line 16 which is branched to the gas turbine combustion chamber 12 and the gasifier 9. The branch toward the gasifier 9 is provided with a boost blower 17.

The flue gases from the gas turbine 14 are muted to a waste-heat recovery boiler 5, where the heat content of the flue gases is recovered for heating the recycle steam of the dryer 2 and the injection steam. The injection steam for the gas turbine is generated by means of an evaporator 18 positioned in the waste-heat recovery boiler 5 and the generated steam is then routed along a line 19 into the gas turbine combustion chamber 12. The injection steam routed into the gas turbine 14 and the steam released by the fuel can partially replace the air delivered by the compressor 15, whereby the input power to the compressor is reduced and the output power from the generator 13 is increased by a corresponding amount. The flue gases cooled in the waste-heat recovery boiler 5 are discharged via a scrubber to a flue stack 20.

Figure 2:
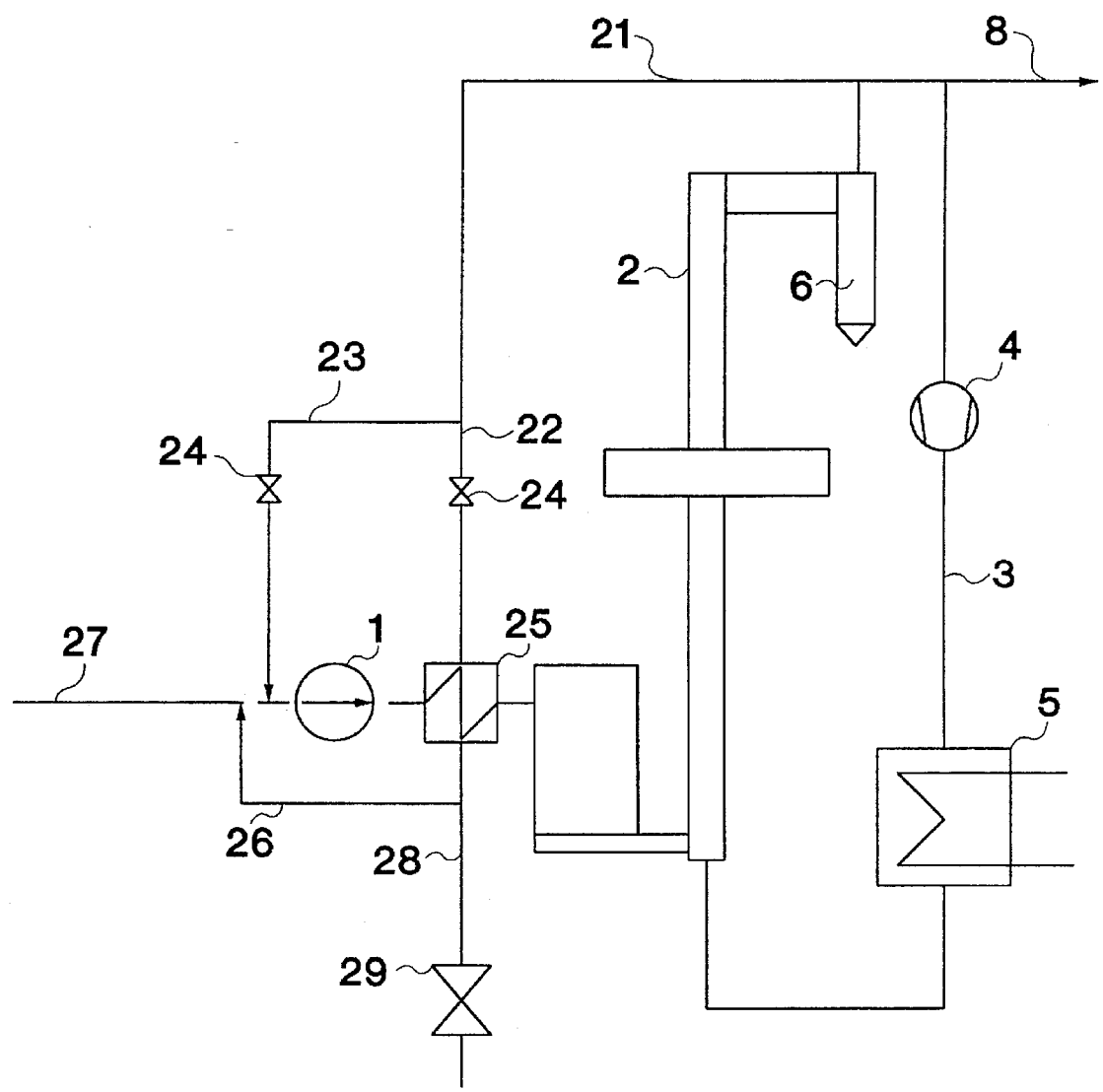
FIG. 2 shows in a more derailed diagram a portion of the configuration illustrated in FIG. 1.

A configuration according to the invention is adapted to the above-described process by connecting a moisturing steam line 21 to the exit steam line leaving the separator 6. The moisturizing steam line 21, is further branched into a mixing steam line 23 and a heating steam line 22. This arrangement is shown in greater detail in FIG. 2. The mixing steam line 23 is routed directly to a fuel feed nozzle 27, in front of the pressurizing/feed pump 1. Correspondingly, the heating steam line is connected after the pump 1 at a heat exchanger 25, through which the fuel feed line passes. From the heat exchanger 25, a water line 26 is taken to the fuel feed line 27, in front of the pump 1. The mixing and heating steam lines 22, 23 have valves 24 mounted on them. Alternatively, the configuration can be provided with a nozzle 28 and a valve 29, whereby these elements permit partial tapping of the water condensed in the heat exchanger 25 out from the system.

In this system the addition of steam into the fuel flow can be varied in multiple ways. For instance, the steam can be mixed into the fuel prior to pressurization, whereby the fuel moisture content and temperature are determined by the quantity and temperature of the mixing steam. In this case, the steam condenses into the moisture content of the fuel and releases its heat into the fuel-water mixture thus elevating its temperature. Alternatively, the steam can be circulated via a heat exchanger 25, where it heats the pressurized fuel and condenses to water. The condensed hot water is then mixed into the fuel flow.

In the following a few embodiments are described to exemplify the application range of the invention.

By condensing the saturated steam of 220° C. temperature and 23 bar pressure from the dryer into the peat fuel, the moisture content of 70% water containing peat (2.33 kg water per 1 kg solids) can be increased to 72.6% (2.65 kg water per 1 kg solids) when the fuel temperature is allowed to increase from 10° C. to 80° C. This type of a mixing configuration does not require the use of the heat exchanger 25 after pressurization, but instead, all steam can be fed as the mixing steam.

Correspondingly, the peat moisture content can be increased by 2, or even by 4 percent units, up to the pumpability limit in any moisture content range without the need for retuning of the process or loss of energy generation efficiency.

By taking a portion of the steam via a condensing heat exchanger 25 so that this portion of the steam releases its heat indirectly into the already pressurized peat, thus heating the peat to a temperature of 150° C., for instance, the peat moisture content can be increased from 70% to 75.4%. This can be implemented so that the process parameters are otherwise retained the same as for peat of 70% moisture content, whereby a fuel of higher moisture content can be used without changes in the energy generation process. Such a configuration requires a heat exchanger, though half of the heat input to the fuel takes place via steam mixing.

Also other kinds of fuels can avail similar moisturizing configurations as moisturizing improves the tightness of the feeder apparatus and permits the use of a ram feeder. For instance, when using brown coal of 62% moisture content, the recirculation of the dryer steam allows heating of the brown coal to 200° C. and simultaneous increase of its moisture content to 70.3% without causing any change in the dryer balance equations (dryer steam discharge rate unchanged, dryer input energy rate unchanged). Correspondingly, heating of the brown coal to 220° C. permits an increase of the moisture content to 71.3%. Brown coal of 62% moisture content contains 1.62 kg water per 1 kg solids, while 70.3% moisture content corresponds to 2.37 kg water per 1 kg solids and 71.3% moisture content to 2.48 kg water per 1 kg solids.

Moisturizing by means of the present method with high economy of energy generation is possible over any moisture content range and with any fuel to bring the fuel moisture content to a value permitting transfer by pumping.

Partial recirculation of the heat of evaporation, which is contained in the steam generated in the dryer, into sensible heat of the fuel in the manner of not mixing the water condensed from the steam back into the fuel gives an additional possibility, over that described above, of increasing the maximum moisture content of the fuel tolerated by the energy generation process. For instance, indirect heating of peat at 75% moisture content (3.0 kg water per 1 kg solids) (at least partially pressurized) to 150° C. with the steam generated by the dryer allows running the process with the rest of the process parameters corresponding to peat of 70% moisture content (2.33 kg water per 1 kg solids). When utilizing the maximum heat content, the method can plausibly permit increasing the maximum moisture Content of the fuel permitted by energy generation process up to a value of approx. 77% (3.3 kg water per 1 kg solids). This property may be particularly valuable in the incineration of different types of purification plant sludges. In this embodiment, the water condensed in the heat exchanger 8 can be tapped out from the system via a nozzle 28.

Besides those described above, the invention may have alternative embodiments.

For instance, instead of the configuration in which the steam can alternatively or simultaneously be used as the mixing steam and/or heating steam, only either of the circuits of the configuration can be employed. Obviously the latter system has less possibilities of variation. The steam used for moisturizing and heating could also be taken from the steam circuit of the dryer, prior to the dryer, but this arrangement might change the mass flow which enters the dryer directly, thereby possibly necessitating retuning of the process conditions. Besides, the temperature and moisture content of the steam discharged from the dryer are better suited for the moisturization of the fuel. The moisturization steam can also be taken from that branch line 8 of the recycle steam circuit along which the steam released by the fuel is derouted from the drying steam.

The applications of the invention are not limited to the energy generation process described as an exemplifying embodiment, but rather, can be applied to all processes in which a water-containing fuel is dried prior to use. Even if the fuel moisturizing and heating configuration according to the invention as such would not be directly utilized, the method can be employed for tuning the energy generation process to its optimum operating range.

If the process employs a dryer without external heating steam recirculation proper into which the drying heat could be introduced indirectly via heat-transferring surfaces, the moisturizing steam is routed from the steam generated from the water separated from the fuel. This approach is applied in the case of a fluidized-bed steam dryer, for instance. The basic principle of the invention remains herein unchanged as the required moisturizing water and heat are recirculated via the fuel feed and pressurization stages without imparting any change in the dryer balance equations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for facilitating pumping of a water-containing fuel mixture into a pressurized space comprising the steps of:

elevating pressure of the water-containing fuel;

pumping the fuel into a pressurized space;

removing water from the fuel in the pressurized space by elevating temperature of the fuel;

removing fuel and generated steam from the pressurized space and separating them from each other;

heating and moisturizing fuel fed into the pressurized space with at least a portion of a flow of steam separated from fuel which has been discharged from the pressurized space, the step of heating and moisturizing taking place prior to the step of pumping the fuel into the pressurized space by mixing a steam flow derouted from the steam flow generated in the pressurized space into a fuel flow prior to bringing the flow to elevated pressure, whereby the steam condenses into the fuel flow, thereby heating and moisturizing the fuel flow.

2. The method as defined in claim 1, wherein the steam flow derouted from the steam flow is taken to a heat exchanger through which the pressurized fuel flow passes, and the method further comprises the step of mixing water condensed in the heat exchanger into the unpressurized fuel flow.

3. The method as defined in claim 2, further comprising the step of removing at least a portion of the water condensed in the heat exchanger from the process via a nozzle connected to the heat exchanger.

4. The method as defined in claim 1, wherein the pressurized space is a pressurized recirculating steam dryer, whereby a flow of heated recycle steam is separated from the fuel flow exiting the dryer and is recycled for reheating and whereby at least a portion of the steam released from the fuel in the dryer is derouted from the recycle steam, the method further comprising the step of using a second steam flow derouted from the recycle steam flow of the dryer at least for heating the fuel flow being fed into the dryer.

5. The method as defined in claim 4, wherein the steam flow to be derouted from a recycle steam circuit of the dryer is derouted from that section of the recycle steam circuit which connects a discharge end of the dryer to a heating point.

6. The method as defined in claim 4, wherein the steam flow to be derouted from a recycle steam circuit of the dryer is derouted from that section of the recycle steam circuit through which the flow of the steam released from the fuel and derouted from the recycle steam flow passes.

7. A configuration for improving feed of a water-containing fuel mixture into a pressurized space comprising:

a pressurized space;

means for elevating pressure of a water-containing fuel, the pressure-elevating means being operatively connected to the pressurized space;

means for pumping the fuel into said pressurized space, the fuel pumping means being operatively connected to the pressure-elevating means;

means for heating the fuel contained in said pressurized space in order to reduce moisture content of the fuel;

means for discharging said fuel and generated steam from said pressurized space and means for separating said fuel and said steam from each other; and means for routing at least a portion of the steam discharged from said pressurized space to heat and moisturize the fuel being fed into the pressurized space, the means for routing comprises a piping nozzle which is connected to a recycle steam piping and the fuel pumping means prior to the pressure-elevating means in order to mix the steam into the fuel flow prior to a pressure elevation stage of the fuel flow.

8. The configuration as defined in claim 7, wherein the piping nozzle connected to said recycle steam piping is connectable to the fuel pumping means at a heat exchanger which is located after the pressure-elevating means in order to heat the fuel flow after the pressure elevation stage of the fuel flow.

9. The configuration as defined in claim 7, wherein the piping nozzle connected to said recycle steam piping is connectable to the fuel pumping means both prior to the pressure-elevating means and after the pressure-elevating means.

10. The configuration as defined in claim 7, wherein the piping nozzle connected to said recycle steam piping is connectable to piping connecting the separating means to the heating means.

11. The configuration as defined in claim 7, further comprising a nozzle connected at the heat exchanger, said nozzle serving for removal of at least a portion of the steam condensed in the heat exchanger.

* * * * *